United States Patent [19]

Wideman et al.

[11] Patent Number: 4,478,993

[45] Date of Patent: Oct. 23, 1984

[54] RUBBER CONTAINING DECARBOXYLATED ROSINS

[75] Inventors: Lawson G. Wideman; Paul H. Sandstrom, both of Tallmadge, Ohio

[73] Assignee: The Goodyear Tire & Rubber Company, Akron, Ohio

[21] Appl. No.: 568,966

[22] Filed: Jan. 6, 1984

[51] Int. Cl.$^3$ ............................................. C08L 93/00
[52] U.S. Cl. ...................... 527/600; 523/150; 523/152; 523/160; 524/77; 524/187; 524/270; 524/271; 524/272; 524/273; 524/274; 524/764; 524/798; 526/238.3
[58] Field of Search ............... 527/600; 524/270–274, 524/764, 798, 77, 187; 526/238.3; 523/150, 152, 160

[56] References Cited

U.S. PATENT DOCUMENTS

| | | | |
|---|---|---|---|
| 1,852,244 | 4/1932 | Humphrey | 260/106 |
| 3,687,889 | 8/1972 | Witte et al. | 260/30.6 R |
| 3,929,755 | 12/1975 | Severson et al. | 524/274 |
| 3,951,901 | 4/1976 | Bluemel et al. | 260/33.6 AQ |
| 3,985,701 | 10/1976 | Schneider et al. | 260/33.6 AQ |
| 4,258,770 | 3/1981 | Davis et al. | 524/274 |
| 4,324,710 | 4/1982 | Davis et al. | 524/274 |
| 4,373,041 | 2/1983 | Wood et al. | 524/77 |
| 4,419,470 | 12/1983 | Davis et al. | 524/274 |

FOREIGN PATENT DOCUMENTS 962519 7/1964 United Kingdom .

OTHER PUBLICATIONS

Howland et al., Ind. & Eng. Chem., vol. 45, No. 5, May 1953, pp. 1053–1059.

*Primary Examiner*—Herbert S. Cockeram
*Attorney, Agent, or Firm*—D. O. Nickey

[57] ABSTRACT

There is disclosed the use of decarboxylated rosins as total or partial replacements for oil in rubber formulations. Vulcanizate properties, low temperature performance, and processibility are comparable when using either the decarboxylated rosins or an aromatic extending oil, however, the decarboxylated rosin extended rubber demonstrates improved abrasion resistance.

7 Claims, No Drawings

RUBBER CONTAINING DECARBOXYLATED ROSINS

TECHNICAL FIELD

This invention relates to a process for the production of rubber-oil mixtures wherein customary petroleum derived extending oils are replaced with "thermal oil" or decarboxylated rosin acid, more specifically, decarboxylated rosin acids which have an acid number of no more than 30.

BACKGROUND ART

Both natural and synthetic elastomers usually require the use of processing aids to assist mechanical breakdown. Materials such as mixtures of oil soluble sulfonic acids of high molecular weight with a high boiling alcohol and a paraffin oil or a blend of a sulfonated petroleum product and selected mineral oils are presently used as processing aids. Some chemicals used primarily for other purposes have a plasticizing action on rubbers in which they are compounded, i.e. benzylthiazole disulfide.

Petroleum, paraffinic and vegetable oils, as well as coal tar and petroleum residues or pitches and naturally occurring or synthetic resins have also been used as compounding materials.

Beneficial effects of processing aids carry on through the mixing cycle permitting incorporation of fillers and other ingredients with low power consumption. These materials also reduce internal friction in calendering and extrusion, thus minimizing scorch.

Various types of rosin acids have been used as extenders for high molecular weight SBR. *Properties of GR-S Extended With Rosin Type Acids*, L. H. Howland, J. A. Reynolds, and R. L. Provost, Industrial and Engineering Chemistry, Vol. 45, No. 5, May 1953. Also included in these initial studies were several nonrosin acids which included tallow fatty acid, oleic acid and naphthenic acid. Reasonably good cured physical properties can be obtained with the rosin type acids, whereas relatively poor physical properties are obtained with the nonrosin acids. Problems associated with the use of rosin acids are cure retardation, high tack and poor low temperature performance, which limit their use as an extender in rubber formulations.

British Pat. No. 962,519 describes elastomeric hydrocarbon copolymers of at least one α-monoolefin and at least one nonconjugated diene which are extended with specific petroleum oils to give normally solid, sulfur curable mixtures.

U. S. Pat. No. 3,951,901 describes a process for preparing a rubber wherein an extending oil with a specific viscosity and a certain specific gravity is added to the copolymer at a particular temperature with a specific agitation so as to form a homogeneous liquid mixture substantially free of particulate copolymer.

U.S. Pat. No. 3,985,701 discloses an oil containing rubber prepared by mixing a rubber selected from the group consisting of natural rubber, homopolymers of conjugated diolefins and copolymers of conjugated diolefins with ethylenically unsaturated monomers, with a mineral oil which is obtained through a specific chemical process.

U.S. Pat. No. 4,324,710 discloses the use of naturally occurring thermoplastic resins as substitutes for process oils. The resins are derived from crude wood rosin which have an acid number between 40 and 105.

U.S. Pat. No. 1,852,244 discloses a method of producing rosin oil which consists of heating the rosin in the presence of a fuller's earth catalyst.

None of the prior art suggest or discloses the use of decarboxylated wood rosins as a total or partial replacement for conventionally accepted extending oils. Further, the prior art does not suggest or disclose the advantageous properties that can be obtained through use of "thermal oil" or decarboxylated rosin as a replacement for petroleum based extending oils. The unexpected properties obtainable through use of the present invention include increased abrasion resistance (particularly after aging) and lack of extractability from aged cured compounds.

Rosin is a solid resinous material that occurs naturally in pine trees. There are three major sources of rosin, (1) gum rosin is from the oleoresin extrudate of the living pine tree, (2) wood rosin from the oleoresin contained in the aged stumps; and (3) tall oil rosin from the waste liquor recovered as a by-product in the Kraft paper industry.

The agen virgin pine stump is the source of wood rosin. The stump is allowed to remain in the ground for about ten years so that its bark and sapwood may decay and slough off to leave the heartwood rich in resin. Hercules has found that production of pine stump rosin can be artificially stimulated by injecting the herbicide, Paraquat, into the lower portion of the tree. This treatment of the stump produces Pinex rosin.

Rosins derived from both oleoresin and aged stump wood are composed of approximately 90 percent resin acids and 10 percent nonacidic components. Chemical treatment of rosins, such as hydrogenation, dehydrogenation, or polymerization are known which produce modified resins.

Resin acids are monocarboxylic acids having the typical molecular formula, $C_{20}H_{30}O_2$. Over the years nomenclature of individual acids has changed. In addition to trivial names, such as abietic, levopimaric, etc. three different numbering systems have been used. IUPAC nomenclature names resin acids as derivatives of abietane. The following is a structural formula for abietic acid:

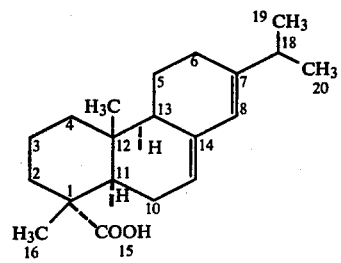

wherein the spacial relationship of substituents on asymmetric carbon atoms are designated as α and β to denote whether the substituents are above or below the plane of the paper. For example, α-methyl denotes the methyl group as below the plane and is represented by a dotted line, while β-methyl would be above the plane and is represented by a solid line.

The resin acid molecule possesses two chemically reactive centers, the double bonds and the carbonyl group. Through these, many modifications in structure and numerous derivatives are obtainable. Because rosin is composed of a number of resin acids, the chemistry of its reactions is relatively complex.

In addition to the double bond reactions, rosin acids also undergo typical carboxyl group reactions. Salts and esters of rosin are important commercial derivatives of rosin. Other reactions involve the reduction of the carboxyl group to the alcohol and the conversion of the carboxyl group to the nitrile.

The structurally hindered nature of the resin acid carboxyl group makes it necessary to use high temperatures or generally drastic conditions to bring about decarboxylation.

The present invention is concerned with the use of decarboxylated rosin acid as a replacement for petroleum based extender oils in rubber compounds, more specifically, tire compounds. The use of decarboxylated rosin acid has unexpectedly improved low temperature performance and provided less tack when compared with rosin acid and also has a significant effect on the abrasion resistance of the compounded rubber. It was also discovered that aged rubber compounds which contained the decarboxylated rosin as the extender had less extractables than similar compounds containing petroleum based extending oils.

DISCLOSURE OF THE INVENTION

There is disclosed a process for preparing rubber compositions which comprises admixing a rubber selected from the group consisting of natural rubber, homopolymers of conjugated diolefins and copolymers of conjugated diolefins and ethylenically unsaturated monomers with decarboxylated rosin acids.

There is further disclosed a process for preparing rubber compositions wherein a decarboxylated rosin acid, at a concentration from 10 parts per hundred to 70 parts per hundred based on weight of rubber, is in an intimate admixture with said rubber.

There is also disclosed a cured rubber stock containing conventional rubber compounds, the improvement comprising the rubber stock having incorporated therein prior to curing thereof a thermal oil derived from wood resin acids which is decarboxylated, said thermal oil substituted for at least 25% by weight of a petroleum derived product normally contained in said rubber stock.

The term "rubber" as used herein embraces both natural rubber and all its various raw and reclaimed forms as well as various synthetic rubbers, i.e., rubber polymers of the type which may be vulcanized with sulfur or other vulcanizing agents. Representative synthetic rubbery polymers of this variety are the homopolymerization products of butadiene and its homologs and derivatives, as for example, methylbutadiene, dimethyl butadiene, pentadiene and chloroprene (neoprene synthetic rubber), as well as copolymers such as those formed from butadiene, or its homologs or derivatives, with other unsaturated organic compounds. Among the latter are acetylenes, e.g. vinyl acetylene; olefins, e.g. isobutylene which copolymerizes with isoprene to form butyl rubber; vinyl compounds, e.g., vinyl chloride, acrylic acid, acrylonitrile (which polymerizes with butadiene to form Buna N rubber), methacrylic acid and styrene, the latter compound polymerizing with butadiene to form Buna-S rubber, as well as vinyl esters and various unsaturated aldehydes, ketones and ethers, e.g. acrolein, methyl isopropenyl ketone and vinyl ethyl ether. Also included, are the various synthetic rubbers prepared from the homopolymerization of isoprene and the copolymerization of isoprene with other diolefins and various unsaturated organic compounds. Additionally included are the synthetic rubbers prepared from modifications of 1,4-cis-polybutadiene and 1,4-cis-polyisoprene and similar synthetic rubbers which have been developed in recent years. Such recently developed rubbers include those that have polymer bound functionality, such as antioxidants and antiozonants. These polymer bound materials are known in the art and can have functionalities that provide antidegradative properties, synergism, cure acceleration and other properties. The polymer bound functions have great value since the pendant functionality possessing the desired activity cannot be extracted since it is chemically attached to the backbone of the polymer.

The preferred rubbers useful within the scope of the present invention are styrene/butadiene copolymers, polybutadiene and polyisoprene rubbers.

The wood resin acids that are decarboxylated and useful in the present invention have a wide range of physical properties. Representative of the resin acids are abietic, levopimaric, neoabietic, palustric, dehydroabietic, dihydroabietic, tetrahydroabietic, pimaric, isopimaric, Δ-isopimaric, elliotinoic and sandaracopimaric.

Rosin oils have been produced by decomposing resin at high temperatures and it has been known to produce a neutral rosin oil by the treatment of resin with heat and hydriodic acid or iron turnings. Neutral rosin oils and rosin oils of low acid number can be obtained by redistillation of rosin oils of higher acid number and separating the cuts which are substantially free from resin acids. The rosin oil is sometimes distilled over alkali in order to free it entirely from rosin acids.

According to the concepts of the present invention, it has been unexpectedly found that a type or class of naturally occurring resins can be partially or totally decarboxylated and be partially or totally substituted for petroleum products utilized in various rubber formulations, specifically for process oils. By process oils, it is meant oils such as aromatic oils, naphthenic oil, paraffinic oils, and blends thereof.

The present invention also contemplates the combined use of decarboxylated resin acids, especially those with an acid number of no more than 30 and customary extender oils in rubber. The extender oils which may be incorporated with the decarboxylated resin acids in rubbers are any of those extender oils which are conventionally used in the rubber industry. Extender oils of particular utility are largely composed of naphthenic and alkylated naphthenic hydrocarbons and mixtures thereof with various aromatic hydrocarbons. Such oils may be obtained from the high boiling fractions of the so-called naphthenic or mixed based crude oils such as Mid Continent, Louisiana, East Texas, and similar crude oils. They may comprise distillate fractions boiling above about 200° C. Suitable fractions are those at least 90 percent of which boil above about 250° C. as more volatile members may be lost during or after compounding and curing the rubber. The oil is preferably free of waxes and asphaltenes for most purposes.

The decarboxylated resin acids of the present invention can be blended with various rubber stocks, according to any conventional or known manner. Generally, it can be used in any conventional rubber stock formulation or other known formulations as a complete replacement for the above-noted specific components, especially for the oil. Such rubber stock formulations are well-known to those skilled in the art. Such formulations can generally be found in any number of rubber handbooks, textbooks and the like.

The present invention also finds utility in, for example, motor mounts, rubber bushings, torsilastic springs, power belts, printing rolls, rubber shoe heels and soles, rubber floor tiles, caster wheels, elastomeric seals and gaskets, conveyor belt covers, wringer rolls, hard rubber battery cases, automobile floor mats, mud flaps for trucks, ball mill liners, and the like.

BEST MODE FOR CARRYING OUT THE INVENTION

EXAMPLE 1

Preparation of thermal oil A 3.45 kg of wood rosin was heated under nitrogen in a glass reactor at 350° C. for 9 hrs. The thermal oil weighed 2.9 kg.

Preparation of thermal oil B 2.0 kg of wood rosin was heated to 350° C. under nitrogen and held there for 24 hrs. The resulting thermal oil weighed 1.73 kg.

Preparation of thermal oil C 0.5 kgs. of wood rosin was added to a glass reactor and heated to 350° C. for 36 hrs. under a blanket of nitrogen. The resulting thermal oil weighed 0.44 kg.

Preparation of thermal oil D 0.45 kg of tall oil rosin was charged into a glass reactor and heated to 350° C. for 16 hrs. under nitrogen. The formed thermal oil weighed 0.39 kg.

Preparation of thermal oil E

A mixture of tall oil rosin (0.045 kg) and wood rosin (0.41 kg) was heated ot 350° C. under nitrogen for 24 hrs. The resulting thermal oil weighed 0.39 kg.

Preparation of thermal oil F 0.45 kg of wood rosin was combined with 0.0045 kg of sodium sulfite and charged into a glass reactor. The contents of the glass reactor were heated to 350° C. under nitrogen for 24 hrs. The resulting thermal oil weighed 0.36 kg.

Preparation of thermal oil G 0.23 kg of wood rosin and 0.23 kg of tall oil rosin were charged into a glass reactor and heated to 350° C. for 24 hrs. under nitrogen. The resulting thermal oil weighed 0.395 kg.

Preparation of thermal oil H 0.5 kg of tall oil rosin was heated for 16 hrs. at 360° C. in a glass reactor under nitrogen. The resulting thermal oil weighed 0.34 kg.

Table I sets out the acid number for thermal oils A–H as determined by ASTM D-465.

TABLE I

| Acid Numbers of Thermal Oils | |
|---|---|
| Thermal Oil | Acid Number |
| A | 65 |
| B | 45 |
| C | 23 |
| D | 11 |
| E | 23 |
| F | 13 |
| G | 8 |
| H | 3 |

From table I it is evident that tall oil rosin (D and H) or tall oil rosin in combination with wood rosin provides a thermal oil that has a low acid number.

EXAMPLE 2

A rubber composition containing the materials set out in Table II was prepared in a BR Banbury using two separate passes for three minutes at 70 RPM.

TABLE II

| Material | Wt Parts |
|---|---|
| SBR* | 70 |
| Polybutadiene** | 30 |
| GPT Carbon Black | 70 |
| Extender | 35 |

*Acid/Alum coagulated latex of SBR 1712 containing 1.25 phr Wingstay 29 TM (p-oriented styrenated diphenylamine) as a stabilizer.
**Budene 1207 TM The Goodyear Tire & Rubber Company.

The sulfur and accelerator were added to the compound in a third Banbury mix for 3 minutes at 40 RPM. The SBR latex was obtained from a commercial facility and coagulated to a dry crumb without the normal addition of aromatic processing oil. The oil, rosin, or decarboxylated rosin additions were made directly to the Banbury during the nonproductive mixing stage. Banbury energy input and temperature at dump for these batches are shown in Table III.

The Pinex TM resin (rosin acid) was obtained from Hercules, Inc. of Wilmington, Del. The "thermal oil" was prepared from the Pinex TM resin by a decarboxylation process as described earlier.

The cure behavior and vulcanizate properties of the aromatic oil control as compared to vulcanizates containing rosin acid or decarboxylated rosin acid are shown in Table IV.

TABLE III

| | Banbury Energy Input | | | | | | |
|---|---|---|---|---|---|---|---|
| Banbury | Non-Productive* | | Non-Productive* | | Productive** | | Total |
| Batches (Control) | Work MJ/m³ | Temp °C. | Work MJ/m³ | Temp °C. | Work MJ/m³ | Temp °C. | Work MJ/m³ |
| Aromatic Oil*** | 740 | 133 | 820 | 138 | 465 | 80 | 2025 |
| Pinex TM | 715 | 138 | 830 | 155 | 475 | 90 | 2020 |
| "Thermal Oil" A | 788 | 140 | 855 | 155 | 483 | 92 | 2126 |
| "Thermal Oil" B | 760 | 138 | 833 | 155 | 485 | 88 | 2098 |

*3 min @ 70 RPM
**3 min @ 40 RPM
***Tufflo 491 TM Atlantic Richfield Company

TABLE IV
CURE BEHAVIOR AND VULCANIZATE PROPERTIES*

| Compound No. | | 1 | 2 | 3 | 4 |
|---|---|---|---|---|---|
| Extender | | Aromatic Oil | Pinex TM | "Thermal Oil" A | "Thermal Oil" B |
| Acid No. | | 4 | 160 | 65 | 45 |
| ML/4 @ 100° C. | | 63 | 85 | 74 | 71 |
| Rheometer | Max Torque | 60 | 42 | 57 | 57 |
| 149° C. | Min Torque | 12 | 15 | 14 | 14 |
| | $\Delta$ Torque | 48 | 27 | 43 | 43 |
| | $T_{90}$, minutes | 16 | 45 | 27 | 22 |
| | $T_2$, minutes | 7 | 5 | 7 | 7 |
| Stress | TS,** MPa | 17.7 | 13.1 | 17.6 | 17.9 |
| Strain | EB,*** % | 435 | 765 | 485 | 485 |
| | $M_{300}$,**** MPa | 11.3 | 4.7 | 10.0 | 9.9 |
| | Shore A | 67 | 79 | 71 | 69 |
| ASTM | Young's modulus @ 25° C., MPa | 6.4 | 14.2 | 7.7 | 8.7 |
| D1053 | $T_2$, °C. | −30 | −13 | −19 | −26 |
| Flex Test | $T_{10}$, °C. | −41 | −36 | −37 | −41 |
| | $T_{100}$, °C. | −47 | −44 | −43 | −45 |
| Rebound | Cold, % | 51.0 | 40.2 | 45.5 | 47.3 |
| | Hot, % | 69.6 | 42.0 | 63.6 | 65.7 |

*Stress-strain and flex samples cured 32 minutes @ 149° C., rebound samples cured 42 minutes @ 149° C.
**TS — Tensile Strength
***Elongation at break
****300% modulus From Table IV it is evident that the compound No. 2, containing Pinex TM as the extender exhibited a slower rate of cure and a reduced maximum rheometer torque value when compared with the aromatic oil control samples and with the samples containing decarboxylated rosin acid (Thermal Oils A and B). The stress-strain properties of the thermal oil-containing samples are comparable to the aromatic oil control, whereas the rosin acid sample exhibited a much lower 300 percent modulus and tensile strength.

The low temperature performance of these vulcanizates was determined by the use of the ASTM D1053 flex test. This test involves an initial measurement of the Young's modulus at 25° C. and then repeated measurement of the modulus at decreasing temperatures. The temperature at which the test sample exhibits two times its original modulus is recorded as $T_2$, five times its original modulus, $T_5$, etc. The sample containing rosin acid exhibits poor low temperature performance as shown by its high value of $T_2$. The thermal oil containing samples show a steady improvement of low temperature performance with decreasing acid number, which approaches the values observed for the aromatic oil control.

The rosin acid-containing sample exhibited very poor hysteresis as shown by its low cold and hot rebound values, whereas the thermal oil-containing samples show rebound values which begin to approach those of the aromatic oil control.

EXAMPLE 3

A rubber composition containing the materials set out in Table II was prepared in a BR Banbury using two separate passes for three minutes at 70 RPM. The sulfur and accelerator were added to the compounds in a third Banbury mix for 3 minutes at 40 RPM. The SBR latex was obtained from a commercial facility and coagulated to a dry crumb without the normal addition of aromatic processing oil. The aromatic oil or "thermal oils" were added directly to the Banbury during the nonproductive mixing stage.

The cure behavior and vulcanizate properties of the 70/30 SBR/PBD tread formulation which contains aromatic oil or "thermal oils" as the extending oil are compared in Table V. The "thermal oils" of higher acid number (B and C) were produced from Hercules Pinex TM wood rosin, whereas the "thermal oil" of lowest acid number (D) was produced from Westvaco tall oil rosin.

TABLE V
CURE BEHAVIOR AND VULCANIZATE PROPERTIES

| | | Compound | | | |
|---|---|---|---|---|---|
| | | #5 | #6 | #7 | #8 |
| | | | Extender | | |
| | | Aromatic | "Thermal Oils" | | |
| | | Oil | B | C | D |
| | Acid No | 4 | 45 | 23 | 11 |
| ML/4 @ 100° C. | | 58 | 66 | 66 | 58 |
| Rheometer | Max Torque | 61 | 57 | 59 | 56 |
| 300° F. | Min Torque | 12 | 14 | 14 | 13 |
| | $\Delta$ Torque | 49 | 43 | 45 | 43 |
| | $T_{90}$ | 17 | 23 | 23 | 18.5 |
| | $T_2$ | 6.5 | 6 | 6.5 | 6.5 |
| Stress* | TS, MPa | 17.7 | 17.3 | 17.2 | 15.4 |
| Strain | EB, % | 430 | 500 | 460 | 410 |
| | $M_{300}$, MPa | 11.3 | 9.1 | 10.1 | 10.3 |
| | Shore A | 67 | 67 | 67 | 64 |
| ASTM* 1053 | Young's Modulus @ 25° C., MPa | 6.5 | 6.0 | 6.0 | 5.1 |

TABLE V-continued
CURE BEHAVIOR AND VULCANIZATE PROPERTIES

| | | Compound #5 | #6 | #7 | #8 |
|---|---|---|---|---|---|
| | | | Extender | | |
| | | Aromatic Oil | "Thermal Oils" B | C | D |
| | Acid No | 4 | 45 | 23 | 11 |
| Flex | $T_2$, °C. | −30 | −22 | −22 | −26 |
| | $T_5$, °C. | −43 | −40 | −40 | −43 |
| | $T_{10}$, °C. | −47 | −46 | −47 | −48 |
| Pierced DeMattia* Flex | inches @ 50,000 flexes | 1.0 | 0.76 | 0.75 | 0.80 |
| 66% Flex Hot* | Ave, min. | 29 | 25 | 17 | 20 |
| Rebound*** | Cold, % | 52.0 | 48.7 | 50.6 | 55.4 |
| | Hot, % | 69.6 | 63.6 | 65.2 | 69.6 |
| Dynamic* | Modulus, kg/cm$^2$ | 72.9 | 75.5 | 75.2 | 61.6 |
| Properties | Resilience, % | 40.9 | 34.3 | 36.9 | 43.6 |
| 100° C. | Int Visc, Kp | 27.5 | 34.1 | 31.6 | 21.6 |
| | Hx | 110.8 | 127.5 | 121.9 | 89.3 |
| | Hf | 93.2 | 100.1 | 96.5 | 105.4 |
| Goodrich** | Set, % | 2.6 | 4.4 | 4.3 | 3.3 |
| Flex | Temp, Rise, °C. | 40 | 46 | 45 | 42 |
| | Static Comp, in | .217 | .229 | .216 | .244 |
| | Hardness | 65 | 66 | 67 | 62 |
| Pico Abrasion** | 4.5 Kg load | .016 | .015 | .015 | .015 |
| cc Loss | 9.0 Kg load | .052 | .049 | .049 | .050 |
| Skid** | Dry asphalt | 76 | 77 | 76 | 75 |
| Resistance | Wet asphalt | 58 | 56 | 55 | 56 |
| | Dry concrete | 92 | 91 | 92 | 93 |
| | Wet concrete | 65 | 66 | 66 | 62 |

*32' @ 149° C. (300° F.)
**42' @ 149° C. (300° F.)
***47' @ 149.20 C. (300° F.)

The SBR/PBD tread compounds containing the prepared "thermal oils" exhibit smaller rheometer Δ torque values. The "thermal oil" of higher acid number (23 and 45) also cause a reduction in cure rate as shown by larger $T_{90}$ values.

The SBR/PBD tread compounds containing the higher acid number "thermal oils" exhibit tensile strength equivalent to that of the compounds containing aromatic oil, whereas the test compound #4 containing the low acid number "thermal oil" has a slightly lower value. All of the tread compounds containing the "thermal oils" have lower 300 percent modulus values (10 to 20%) when compared to the tread compounds containing aromatic oil.

The low temperature performance of these vulcanizates was determined by use of the Gehman flex test (ASTM D-1053). The test samples with the "thermal oils" as the extending oil exhibit 5 to 20 percent lower modulus values when compared to the control (aromatic oil). Although the $T_2$ values of the test samples containing the lowest acid number "thermal oil" are slightly higher than the control, these small differences would not be expected to have a negative effect on low temperature performance.

All of the experimental compounds showed less crack growth than the control after 50,000 flex cycles on the DeMattia test machine.

The 66 percent flex results, which reflect time to sample failure, show marginally better flex life for the control when compared to the samples containing "thermal oil."

The rebound and resilient values of the "thermal oil" extended samples show a steady increase as the acid number is decreased from 45 to 11. The vulcanizates containing the "thermal oil" of lowest acid number exhibit equal to higher rebound values and slightly higher dynamic resilience values when compared to the control.

The Goodrich flex results show a steady decrease of heat build-up for the "thermal-oil" extended compounds with decreasing acid number, which parallels the increase of rebound and resilience. The low acid number "thermal oil" yield values of heat build-up which are similar to the control.

All of the test compounds exhibit slightly lower volume loss data from the Pico abrasion test at both load conditions when compared to the control. The test compounds also exhibit similar skid data to the control under the indicated laboratory test conditions.

The prepared "thermal oil" of lowest acid number appears to be an excellent candidate as a replacement for petroleum based extending oils.

EXAMPLE 4

According to the procedure described in Examples 2 and 3, aromatic oil and "thermal oils" F, G and H were added to a 70/30 SBR/PBD tread formulation. The original and aged properties are compared in Table VI. The cure behavior of the aromatic oil control (Compound #9) and the experimental samples containing "thermal oil" (Compound Nos. 10, 11 and 12) compare favorably except for a slightly longer time to reach 90% of cure ($T_{90}$). The original stress-strain properties and the nitrogen aged stress-strain properties show little difference between the control and experimental, whereas the air oven aged samples show higher tensile strength and 200% modulus for the experimental samples.

The original dynamic properties for the control and experimental samples compare favorably, except that the dynamic resilience of the experimental samples show a decrease as the acid number is lowered from 23 to 8. The aged dynamic properties show higher dynamic modulus and lower dynamic resilience for the experimental samples when compared to the control.

crosslinks with aging is nearly identical for the control sample and the "thermal oil" experimental samples.

TABLE VI

ORIGINAL AND AGED VULCANIZATE PROPERTIES

| | | Compound | | | |
|---|---|---|---|---|---|
| | | #9 | #10 | #11 | #12 |
| | | | Extender | | |
| | | Aromatic | "Thermal Oil" | | |
| | | Oil | E | F | G |
| | Acid No | 4 | 23 | 13 | 8 |
| ML/4 @ 100° C. | | 56 | 61 | 58 | 58 |
| Rheometer | Max Torque | 56 | 55 | 55 | 56 |
| 149° C. | Min Torque | 11 | 12 | 11 | 12 |
| | Δ Torque | 45 | 43 | 44 | 44 |
| | $T_{90}$ | 18 | 23 | 23 | 21 |
| | $T_2$ | 7.5 | 7.0 | 7.5 | 7.0 |
| Stress | TS, MPa | 15.7 | 16.7 | 15.1 | 16.6 |
| Strain | EB, % | 460 | 530 | 490 | 490 |
| Original | $M_{200}$, MPa | 4.8 | 4.1 | 4.2 | 4.5 |
| | Shore A | 66 | 67 | 67 | 66 |
| Stress | TS, MPa | 12.2 | 14.3 | 13.5 | 14.0 |
| Strain | EB, % | 270 | 280 | 270 | 250 |
| Aged 3 days | $M_{200}$, MPa | 8.8 | 10.1 | 10.0 | 11.7 |
| Air oven, 100° C. | Shore A | 74 | 81 | 80 | 81 |
| Stress | TS, MPa | 13.1 | 14.6 | 12.9 | 14.4 |
| Strain | EB, % | 350 | 390 | 350 | 360 |
| Aged 5 days | $M_{200}$, MPa | 5.7 | 5.8 | 5.9 | 6.3 |
| $N_2$ bomb, 122° C. | Shore A | 67 | 70 | 69 | 71 |
| | | Compound | | | |
| | | #13 | #14 | #15 | #16 |
| | | | Extender | | |
| | | Aromatic | "Thermal Oil" | | |
| | | Oil | E | F | G |
| | Acid No | 4 | 23 | 13 | 8 |
| Rebound | Cold, % | 53.9 | 50.6 | 53.4 | 54.5 |
| | Hot, % | 69.6 | 65.7 | 67.4 | 69.0 |
| ORIGINAL | | | | | |
| Dynamic | Modulus, kg/cm$^2$ | 72.1 | 75.2 | 71.2 | 71.0 |
| Properties | Resilience, % | 39.3 | 36.2 | 38.1 | 39.0 |
| 100° C. | Int. Visc, Kp | 28.4 | 32.3 | 29.0 | 28.2 |
| | Hx | 112.4 | 123.4 | 113.3 | 111.3 |
| | Hf | 96.8 | 97.6 | 100.1 | 98.8 |
| AGED | | | | | |
| Dynamic | Modulus, kg/cm$^2$ | 85.2 | 116.4 | 116.9 | 127.4 |
| Properties | Resilience, % | 41.5 | 36.3 | 37.7 | 38.0 |
| 100° C. | Int. Visc, pa.S | 60.0 | 49.7 | 48.1 | 52.0 |
| Aged 3 days | Hx | 128.0 | 190.4 | 187.1 | 202.3 |
| Air oven 100° C. | Hf | 79.0 | 62.9 | 61.3 | 55.9 |
| Dynamic | Modulus, kg/cm$^2$ | 65.6 | 94.1 | 96.7 | 92.9 |
| Properties | Resilience, % | 42.0 | 37.2 | 39.7 | 37.4 |
| 100° C. | Int. Visc, Kp | 24.0 | 39.3 | 37.7 | 38.5 |
| Aged 5 days | Hx | 97.8 | 151.8 | 149.7 | 149.4 |
| $N_2$ bomb at 122° C. | Hf | 101.6 | 76.7 | 71.7 | 77.5 |

EXAMPLE 5

The effect of air oven or nitrogen aging on the low temperature performance of an aromatic oil control and experimental samples containing "thermal oil" was determined (Table VII). These samples were prepared as indicated in Example 2. The results clearly indicate that although aging does produce a change of Young's modulus, an increase in most cases, it does not significantly affect the low temperature performance as shown by the $T_2$ and $T_5$ values.

EXAMPLE 6

The effect of air oven aging or nitrogen aging on the crosslink density or distribution of an aromatic oil control and experimental samples containing "thermal oil" was determined (Table VIII). The amount of oil extractable from the vulcanizate samples before and after aging was also determined. These samples were prepared as indicated in Example 2. The distribution of crosslinks with aging is nearly identical for the control sample and the "thermal oil" experimental samples. Although the original crosslink density for all of the vulcanizates is equivalent, after aging the thermal oil samples exhibit slightly higher crosslink densities. Measurement of the percent extractable in heptane of the cured vulcanizates gave totally unexpected results. The original unaged vulcanizates containing aromatic oil or thermal oil exhibit similar amounts of percent extractable in heptane. Extraction of the aged samples, particularly after air oven aging, indicates that the thermal oil has become nearly unextractable, whereas the aromatic oil exhibits only a small decrease of percent extractable. The total amount of oil in the cured compounds is 16% by weight. The higher value for the original samples represent the extraction of uncured low molecular weight rubber and residues from the sulfur vulcanization system which normally amounts to a value of 5 to 10 percent depending upon the compounding recipe.

TABLE VII
EFFECT OF AGING ON LOW TEMPERATURE PERFORMANCE

| | | Compound #17 | Compound #18 | Compound #19 |
|---|---|---|---|---|
| | | | Extender | |
| | | Aromatic Oil | "Thermal Oil" C | "Thermal Oil" D |
| | Acid No | 4 | 23 | 11 |
| Original Vulcanizate | | | | |
| Gehman | Young's Mod. @ 25° C., MPa | 6.5 | 6.0 | 5.1 |
| Flex | $T_2$, °C. | −30 | −22 | −26 |
| | $T_5$, °C. | −43 | −40 | −43 |
| Air Aged Vulcanizate | | | | |
| Flex D1053 | Young's Mod. @ 25° C., MPa | 7.8 | 12.5 | 13.8 |
| Flex | $T_2$, °C. | −25 | −23 | −26 |
| | $T_5$, °C. | −41 | −40 | −41 |
| Nitrogen Aged Vulcanizate | | | | |
| ASTM D1053 | Young's Mod. @ 25° C., MPa | 5.3 | 6.4 | 6.6 |
| Flex | $T_2$, °C. | −30 | −20 | −24 |
| | $T_5$, °C. | −41 | −37 | −41 |

TABLE VIII
EFFECT OF AGING ON CROSSLINK DENSITY AND DISTRIBUTION

| | | Compound #13 | Compound #14 | Compound #15 |
|---|---|---|---|---|
| | | | Extender | |
| | | Aromatic Oil | "Thermal Oil" C | "Thermal Oil" D |
| | Acid No | 4 | 23 | 11 |
| Original Vulcanizate | | | | |
| Crosslink density, y × $10^4$, moles/cm$^3$ | | 2.24 | 2.21 | 2.28 |
| Crosslink density, | | | | |
| Sx, polysulfide | | 43 | 45 | 43 |
| S2, disulfide | | 29 | 30 | 31 |
| S1, monosulfide | | 28 | 25 | 26 |
| % by wt. Extractable-heptane solvent | | 20.6 | 19.1 | 18.9 |
| GPC of Extract | Mw | 550 | 520 | 560 |
| | Mn | 260 | 210 | 210 |
| | HI (Mw/Mn) | 2.1 | 2.4 | 2.7 |
| Air Aged Vulcanizate | | | | |
| Crosslink density, y × $10^4$, moles/cm$^3$ | | 3.53 | 3.85 | 3.99 |
| Crosslink distribution | | | | |
| Sx, polysulfide | | 31 | 30 | 31 |
| S2, disulfide | | 25 | 27 | 28 |
| S1, monosulfide | | 44 | 43 | 41 |
| % by wt. Extractable | | 17.0 | 9.86 | 9.38 |
| GPC of Extract | Mw | 550 | 810 | 730 |
| | Mn | 260 | 370 | 330 |
| | HI (Mw/Mn) | 2.1 | 2.2 | 2.2 |
| Nitrogen Aged Vulcanizate | | | | |
| Crosslink density, y × $10^4$ moles/cm$^3$ | | 2.41 | 2.81 | 2.71 |
| Crosslink distribution, | Sx, % | 26 | 12 | 12 |
| | S2, % | 5 | 16 | 19 |
| | S1, % | 69 | 72 | 69 |
| % Extractable | | 21.9 | 16.0 | 18.1 |

EXAMPLE 7

The formulation set out in Table II was used to compare the effect of aging on the abrasion resistance of vulcanizate samples containing aromatic oil or thermal oil. Cured pico abrasion samples were aged in a circulating air oven for 3 and 6 days at 100° C. or aged in a nitrogen bomb (552 kPa (80 psi N$_2$)) for 5 and 10 days at 122° C. The data in Table XI clearly demonstrates the superiority of the thermal oil containing vulcanizates when comparing original and aged pico abrasion volume loss data.

TABLE IX
EFFECT OF AGING ON ABRASION RESISTANCE

| | Compound #20 | Compound #21 |
|---|---|---|
| | | Extender |
| | Aromatic Oil | Thermal Oil H |
| Acid No. | 4 | 3 |
| Original vulcanizate Pico Abrasion, 9.0 Kg load Volume loss, cc | .056 | .055 |
| Air Aged, 3 days Volume loss, cc | .047 | .046 |
| Air Aged, 6 days Volume loss, cc | .071 | .051 |
| Nitrogen Aged, 5 days Volume loss, cc | .062 | .059 |
| Nitrogen Aged, 10 days Volume loss, cc | .076 | .065 |

While certain representative embodiments and details have been shown for the purpose of illustrating the invention, it will be apparent to those skilled in this art that various changes and modifications may be made therein without departing from the scope of the invention.

We claim:

1. A process for preparing rubber compositions which comprises admixing a rubber selected from the group consisting of natural rubber, homopolymers of conjugated diolefins and copolymers of conjugated diolefins and ethylenically unsaturated monomers with decarboxylated rosin acids.

2. A process for preparing rubber compositions according to claim 1 wherein the decarboxylated rosin acid is at a concentration from 10 parts per hundred to 70 parts per hundred based on weight of rubber and is in an intimate admixture with said rubber.

3. In a cured rubber stock containing conventional rubber compounds, the improvement comprising:
the rubber stock having incorporated therein prior to curing thereof a thermal oil derived from wood resin acids which is decarboxylated, said thermal oil substituted for at least 25% by weight of a petroleum derived product conventionally contained in said rubber stock.

4. A cured rubber stock according to claim 3, wherein said thermal oil has an acid number of less than 30 and wherein the amount of said thermal oil ranges from 25 to 100% of said petroleum derived product which has been substituted.

5. A process according to claim 1 wherein the rubber is styrene butadiene rubber and the decarboxylated rosin acid is at a concentration from 50 to 100 parts per hundred parts of rubber.

6. A rubber composition which comprises (1) a rubber selected from the group consisting of natural rubber, homopolymers of conjugated diolefins and copolymers of conjugated diolefins and ethylenically unsaturated monomers, and (2) a thermal oil which is prepared by heating wood rosin, tall oil rosin or wood rosin and tall oil rosin to a temperature of 350° C. for at least 9 hrs. to yield a thermal oil having an acid number of less than 30.

7. A rubber composition according to claim 6 wherein the rubber is selected from the group consisting of styrene butadiene rubber and polybutadiene.

* * * * *